(12) United States Patent
Xiao et al.

(10) Patent No.: US 9,304,963 B2
(45) Date of Patent: Apr. 5, 2016

(54) DATA TABLE STRUCTURE FOR SELF-ORGANIZED MANAGEMENT OF COMMUNICATION WITH FUNCTIONAL MODULES COUPLED VIA BACKPLANE ASSEMBLY BASED ON RECEIVED MODULE DESCRIPTION INCLUDING CONTROL LOGIC

(75) Inventors: Xuyyan Xiao, Shanghai (CN); Mark E. Delker, Sheboygan Falls, WI (US); Benfeng Tang, Shanghai (CN); Chao Chen, Shanghai (CN); Steven A. Lombardi, Whitewater, WI (US); David Berman, Franklin, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 1049 days.

(21) Appl. No.: 13/007,314

(22) Filed: Jan. 14, 2011

(65) Prior Publication Data

US 2012/0185704 A1 Jul. 19, 2012

(51) Int. Cl.
*G06F 15/163* (2006.01)
*G06F 1/26* (2006.01)
*G05B 19/042* (2006.01)
*H02J 13/00* (2006.01)

(52) U.S. Cl.
CPC .......... *G06F 15/163* (2013.01); *G05B 19/0426* (2013.01); *G06F 1/26* (2013.01); *H02J 13/0079* (2013.01); *G05B 2219/25009* (2013.01); *G05B 2219/25066* (2013.01); *G05B 2219/25093* (2013.01); *G05B 2219/32144* (2013.01); *Y02B 70/3241* (2013.01); *Y04S 20/227* (2013.01)

(58) Field of Classification Search
None
See application file for complete search history.

(56) References Cited

U.S. PATENT DOCUMENTS

| | | | | |
|---|---|---|---|---|
| 5,274,767 A | * | 12/1993 | Maskovyak | 710/16 |
| 5,649,100 A | * | 7/1997 | Ertel et al. | 709/225 |
| 6,970,771 B1 | | 11/2005 | Preiss et al. | |
| 8,102,770 B2 | * | 1/2012 | Morrill et al. | 370/235 |

* cited by examiner

*Primary Examiner* — Kenneth Kim
(74) *Attorney, Agent, or Firm* — Quarles & Brady LLP

(57) ABSTRACT

Systems and methods self-organize a multifunctional power and energy control and management system by integrating multiple backplane based modules through module descriptions, the module descriptions including control logic and parameters associated with the modules. Dynamic data table structures may be configured based on information provides with the module descriptions and provide for improved data accessing, storing, and updating.

17 Claims, 4 Drawing Sheets

DATA TABLE STRUCTURE FOR SELF-ORGANIZED MANAGEMENT OF COMMUNICATION WITH FUNCTIONAL MODULES COUPLED VIA BACKPLANE ASSEMBLY BASED ON RECEIVED MODULE DESCRIPTION INCLUDING CONTROL LOGIC

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to power and energy related control and monitoring functions and, more particularly, to systems and methods for building a multifunctional power and energy control and management system by integrating multiple backplane based modules through module descriptions.

Often, for power and energy related control and monitoring applications, there are a variety of application specific requirements that add complexity and cost to the application specific systems, typically based on the types and amounts of data gathered. Examples of power and energy related control and monitoring applications include power monitoring, HVAC, line synchronization, motor protectors, transformer protectors, and application specific devices. Using power monitoring as an example, unfavorable events, such as voltage sags, swells, or transient events can occur randomly any location within a facility's distribution system. These events can damage or reduce the life of equipment connected to the distribution system, they can cause connected equipment to malfunction, or even worse, cause harm to personnel. A power monitoring system is used to detect and capture typically large amounts of data related to these events when they occur. The captured data can then be examined and analyzed in an effort to understand the event and determine the cause of the event. Potential corrective actions can be identified and implemented to reduce or eliminate a reoccurrence of the event.

Prior known systems for power and energy related control and monitoring applications have several drawbacks. For example, when these prior known systems are configured for first time use, or when additional modules are added to the system, these systems are not able to "self organize," meaning they need user intervention prior to and during initialization and revisions in order to properly configure the system to function according to the desired application. In addition, prior known systems have not adequately addressed the need for greater data storage while combining greater data storage with improved data access speeds.

In order to configure these known systems prior to use, the end user must use configuration software. Some of these prior known systems include multiple modules assembled together, requiring the user to manipulate the configuration software to indicate what modules are part of the system, and then the configuration software, based upon the user input, configures the system as input to the configuration software by the user. If an error in the configuration of the system is made by the user, the system may not recognize the error because the system would be configured based upon the user input.

Additionally, these systems typically access and store large amounts of power and energy related data for later review and analysis. These prior types of systems frequently incorporate a commercial or free embedded database to perform data access, storage, and updates. Because these databases are general purpose, they are rarely if ever suitable for the ever increasing large amounts of power and energy related data that is accessed, stored, and frequently updated.

It would, therefore, be desirable to have systems and methods that self-organize a multifunctional power and energy control and management system by integrating multiple backplane based modules through module descriptions. A dynamic data structure configured with module description information improves data access, storage, and updating.

BRIEF SUMMARY OF THE INVENTION

The present embodiments overcomes the aforementioned drawbacks of the previous strategies by providing systems and methods that are adapted to self-organize a multifunctional power and energy control and management system by integrating multiple backplane based modules through module descriptions without the need for a user to configure the system by inputting system information into configuration software. A dynamic data structure may be configured based on the module descriptions to improve data access, storage and updating.

In accordance with one aspect of the invention, a system is provided. The system comprises a backplane assembly and at least one functional module coupled to the backplane assembly. The functional module is adapted to receive process related data, and includes a unique module description, the module description including information about data structures and control logic of the at least one functional module. A primary module is also coupled to the backplane assembly, with the primary module including a description parser adapted to receive and interpret the at least one module description upon self-organization of the system and to create a dynamic data table structure.

In accordance with another aspect of the invention, a power and energy control and management system is provided. The power and energy control and management system comprises a backplane assembly with a functional module coupled to the backplane assembly. The functional module includes at least one internal data table and a unique module description, the unique module description including information about the internal data table parameters and external data table parameters of the functional module. The system also includes a primary module coupled to the backplane assembly, the primary module including a description parser adapted to receive and interpret the internal data table parameters and the external data table parameters of the functional module upon self-organization of the system, and to create a dynamic data table structure including at least one external data table, the at least one external data table being dynamically created based on the external data table structures of the functional module.

In accordance with yet another aspect of the invention, a method of self-organizing a power and energy control and management system is provided. The method comprising steps including inputting into a description generator tool information about a functional module, the information comprising information about internal data table structures and external data table structures; creating a module description specific to the functional module by compiling the information input into the description generator tool; saving the module description in memory in the functional module; and self-organizing the system by i) sending the module description across a backplane assembly to a primary module, the primary module adapted to receive the module description; ii) using a description parser to create dynamic data table structures based on the module description; and iii) establishing an I/O connection between the primary module and the functional module.

To the accomplishment of the foregoing and related ends, the embodiments, then, comprise the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE SEVERAL VIEWS OF THE DRAWINGS

The embodiments will hereafter be described with reference to the accompanying drawings, wherein like reference numerals denote like elements, and.

DETAILED DESCRIPTION OF THE INVENTION

The various aspects of the present embodiments will be described in connection with various power and energy related control and management systems and methods. That is because the features and advantages that arise due to the embodiments are well suited to this purpose. For this reason, the systems and methods will be described in the context of a system configured for a power monitoring application. Still, it should be appreciated that the various aspects of the invention can be applied to achieve other objectives as well. For example, the systems and methods of the present invention may include systems adapted for other applications such as HVAC, line synchronization, motor protectors, transformer protectors, application specific devices, and any combination, as non-limiting examples, for the same or similar purposes.

A flexible and multifunctional product platform is disclosed and can be adapted to meet any of the application requirements mentioned herein. This platform provides users with a flexible system able to lower development and maintenance costs, while providing improved systems and methods to implement other new power and energy control and management application functions.

In order to implement the system and methods, a number of technical problems need to be solved. For example, it would be desirable to provide a user friendly and efficient way to self-organize a multifunctional power and energy control and management system without requiring the system user to use configuration software, and to add new modules to the system with little or no firmware changes to the existing system modules. In addition, the large amounts of power and energy data require an improved access mechanism to provide faster data updating and accessing.

The disclosure herein provides systems and methods adapted to self-organize a multifunctional power and energy control and management system that overcome the technical problems above by integrating multiple backplane based modules through individual module descriptions. Incorporating dynamic data table structures that may be configured based on the module descriptions provides for improved data accessing, storing, and updating.

Figure 1:
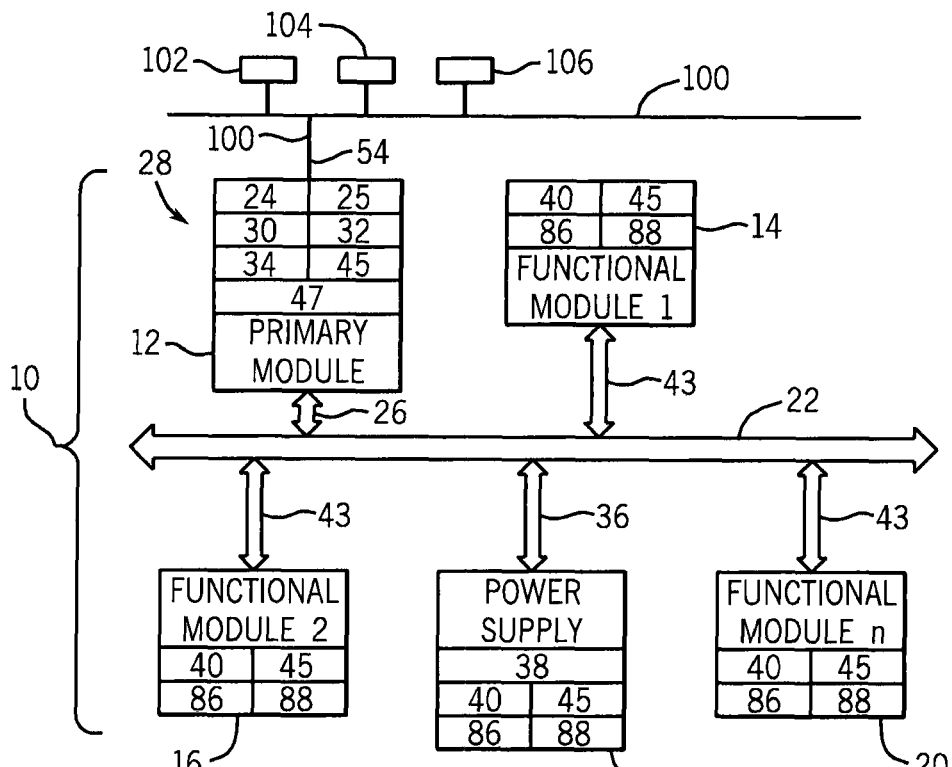
FIG. 1 is a schematic diagram of a power and energy control and management system in accordance with the present embodiments.

Referring now to FIG. 1, exemplary power and energy control and management system 10 is shown that overcomes the drawbacks addressed above. The system 10 may comprise a primary module 12 and multiple functional modules, including functional module 1 (14), functional module 2 (16), power supply module 18, and up to functional module n (20), where n may be any maximum number of modules the system may support. FIG. 1 shows four functional modules 14, 16, 18, and 20, although more or less may be incorporated into the system 10. The modules exchange data through a backplane assembly 22 and may receive power across the backplane assembly 22 from the power supply module 18.

Each of the components will now described in further detail. It is to be appreciated that the system 10 may include alternative configurations as well. For example, one or more of the modules may be combined, and/or features or functions described for one module may be located or incorporated on a different module. Processors, memory, and communications may be located in or on one or more of the modules, and/or elsewhere on a network coupled to the system 10. Additional modules providing additional system or monitoring related functions may also be included.

In the exemplary embodiment shown in FIG. 1, the modular system 10 may comprise multiple modules coupled to the backplane 22, each of which perform specific functions. Non-limiting examples of modules that may be used in a power and energy control and management system include the primary module 12, a power data acquisition module 14, an I/O module 16, and a power supply module 18. The backplane based modular system 10 is well adapted to configure new systems with different functional module groups.

Primary module 12 may include one or more processors 24 and internal memory 25, and may be configured to be responsible for top level control of the system 10. The primary module may also be configured to manage its communications 26 to and from the backplane assembly 22. Primary module 12 may also include a communications interface 28 including one or more user accessible communication ports 30, 32, 34 (three are shown, although more or less are contemplated). For example, the communication ports may be configured for a variety of communication protocols, including but not limited to USB, serial, wireless, Bluetooth, EtherNet, DeviceNet, ControlNet, and Ethernet with Device Level Ring (DLR) technology. The DLR technology also supports the IEEE 1588 standard for precise time synchronization and standardized Quality of Service (QoS) mechanisms to help prioritize data transmission. One or more of the communication ports allows the system 10 to be networked to additional power and energy control and management systems.

The power supply module 18 may be included and may be adapted to accept user input voltage in either VAC and/or VDC, and configure the input voltage to a system or output voltage that may then be supplied to the backplane assembly 22 for distribution to the other modules, e.g., primary module 12 and functional modules 14, 16, and 20, coupled to the backplane assembly. The power supply module 18 may be configured to manage its communications 36 to and from the backplane assembly 22. It is to be appreciated that both input and output voltages may range from low voltage levels to high voltage levels as is well known in the art. It is also to be appreciated that transformers known in the art may also be used with high voltage systems. The power supply module 18 may also be configured to include standby power, e.g., a standby capacitor or battery 38, for providing power to the system 10 when user input voltage is temporarily not available.

The backplane assembly 22 may be configured as a local Ethernet backplane, although other configurations are contemplated, such as a proprietary configuration. Each module coupled to the backplane assembly 22 is adapted to draw power, e.g., a system voltage, from the backplane assembly and communicate with the primary module 12 and the other modules 14, 16, 18, and 20 across the backplane assembly 22. In addition, the backplane assembly 22 may be configured to provide electrical isolation between modules coupled to the backplane assembly.

Before the very first startup, the primary module 12 knows nothing about any of the functional modules in the system 10. In order to communicate with each functional module, and as part of the self-organization process, the primary module 12 will acquire a unique module description 40 from each of the functional modules 14, 16, 18, and 20, and create a dynamic data table structure 42 (also known as a linked list) to manage the data received from and transmitted to each of the functional modules in the system. Each functional module 14, 16, 20 may be configured to manage its communications 43 to and from the backplane assembly 22. One or more functional modules may be adapted to receive process related data, processes including but not limited to water, air, gas, electric, and steam.

Figure 3:
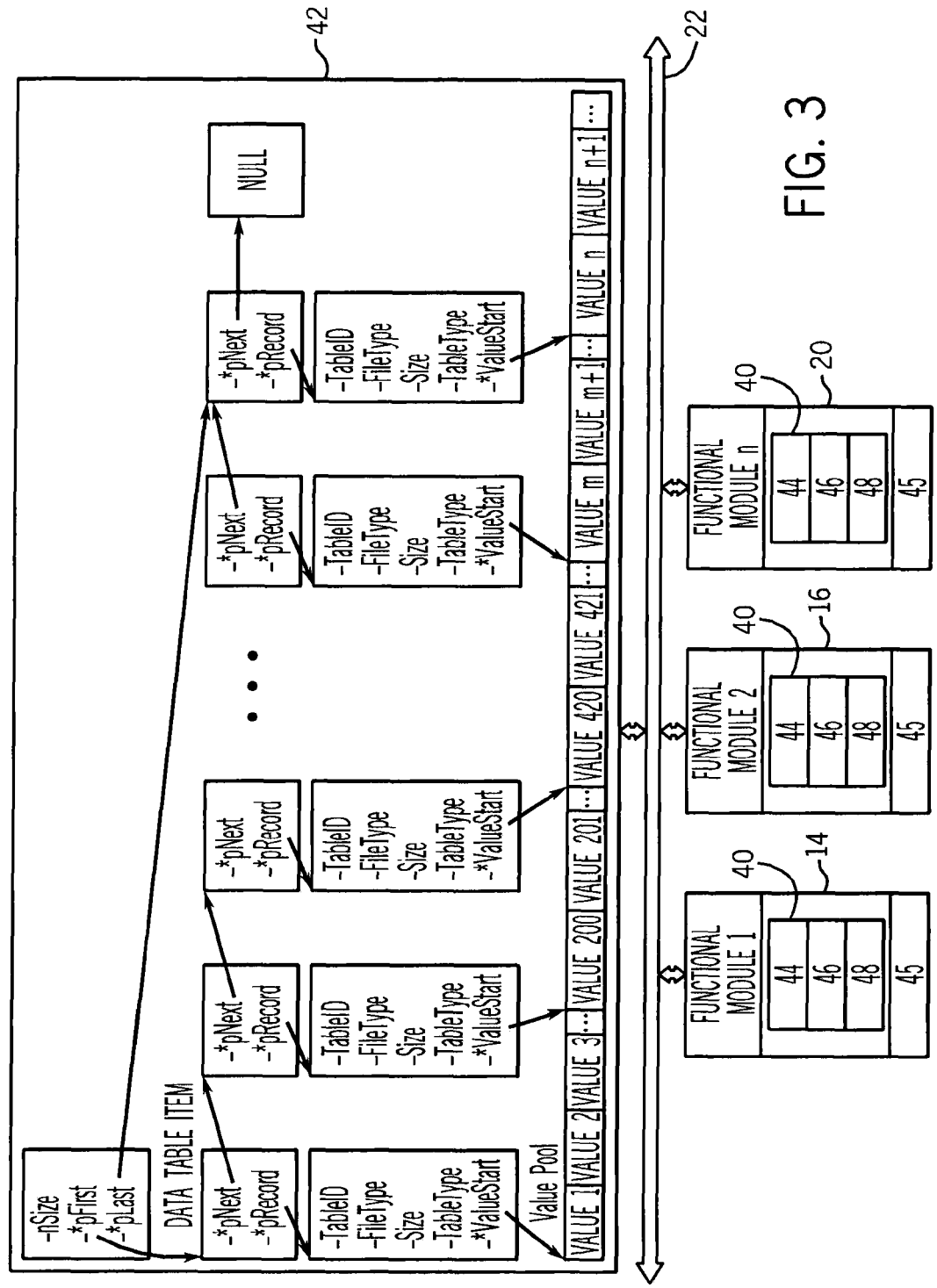
FIG. 3 is a block diagram showing a dynamic data structure of a power and energy control and management system in accordance with the present embodiments.

Each functional module has its own unique embedded module description 40 that describes the module parameters, which includes detailed information about the data and data structures, including internal data table parameters 44 and external data table parameters 46, which describes their contents and properties, and the control logic 48 in the particular functional module (shown in FIG. 3). Each module may have any number of parameters, ranging from one to thousands or more, which are grouped into the data tables. Each functional module has one or more of its own internal data tables 45 to save real-time data and/or configuration parameters. The primary module 12 also has corresponding internal data tables 45 corresponding to each of the internal data tables from each of the functional modules. For example, the functional module 14 may include a static internal "metering data table" in its memory 86, and the primary module 12 desirably includes the same internal "metering data table" in its memory 25, which is created dynamically by the primary module 12 according to the module description 40 of functional module 14. The internal data tables 45 are used to exchange data among the functional modules and the primary module. In one embodiment, the internal data tables 45 may be relatively large to achieve a high backplane throughput.

Only the primary module 12 has external data tables 47, which are used to exchange data with external devices, such as via the network 100. The external data tables 47 are also created dynamically by the primary module 12 according to the module description 40 of each functional module. The external data tables 47 may be organized according to the parameter's physical meanings to provide a more friendly and readily understandable user interface. For example, the functional module 14 may include the static internal "metering data table," which contains values of 150 variables (in this example). These variables can be reorganized into a few external data tables 47, such as "voltage, current, and frequency table," "power data table," and "energy data table," as non-limiting examples.

Figure 2:
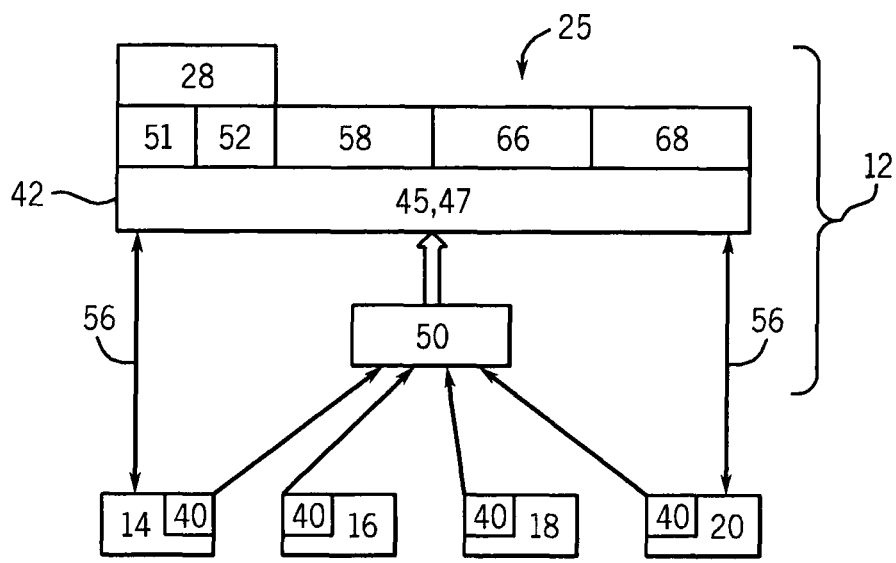
FIG. 2 is a block diagram of the power and energy control and management system of FIG. 1, showing how the system self-organizes and builds communications with the functional modules through their module descriptions.

Referring to FIGS. 1 and 2, and particularly FIG. 2, the primary module 12 includes a description parser 50 and a logic engine 52, and uses the description parser 50 to create the dynamic data table structures 42 and a parameter list 51 according to the functional module descriptions. Parameters in the parameter list 51 may then be selected by an end user as inputs to predefined logic (e.g., set-point logic, min-max comparison logic) in the logic engine 52, or as inputs to custom logic configured by the end user.

Once the data structures 42 are defined for a particular functional module, the primary module 12 can then exchange data with the functional module. The primary module may also be responsible for communication with external devices, such as via the network 100, further described below. The primary module 12 can represent the whole system 10 to communicate with the external devices using the external data tables. The primary module 12 may have data logging threads 66 and other threads 68 in the memory 25, which may be responsible for executing a variety of different functions. For example, some threads may be responsible for backplane communication, some may be responsible for external communications, and others may be responsible for data logging.

In the system run time, the primary module 12 creates I/O connections 56 with each of the functional modules to subscribe data (described below) from the functional modules. When any of the parameters of the functional modules are changed, the functional module will send the new data to the primary module 12, and the primary module 12 will update the dynamic data structure 42 with the new data.

FIG. 2 shows an embodiment of how the primary module 12 builds communication with each of the functional modules in the system through the use of the functional module descriptions 40 and the primary module's description parser 50. During the system initialization (the self-organization), the primary module 12 acquires each functional module's embedded description 40. The description parser 50 then uses each functional module's description 40 to create the dynamic data table structures 42 for the module based on the module description. The data table server 58 then opens an I/O connection 56 between the primary module 12 and each functional module, thereby allowing the primary module 12 to subscribe data from the functional modules (the data publishers).

Description generation tool kits 60 can be developed and made available for users to create module descriptions for new functional modules so they may be incorporated into the multifunctional system. At the same time, it is also contemplated that third party vendors may develop and add their own application specific functions into the system with the use of the description generation tools.

Referring to FIG. 3, the dynamic data table structure 42 in the primary module 12 may be configured as a linked list with a consecutive memory value pool that is well adapted to provide a fast and high volume data updating method. The linked list provides a data structure that consists of a sequence of data records such that in each record there is a field that contains a reference (the link) to the next record in the sequence. The linked list allows the parameter values in the functional module internal data tables 45 to be updated by batch, instead of one by one, although individual parameter updates is certainly contemplated. Use of batch updating for large amounts of real time power data provides improved performance.

The system 10 may further incorporate a time protocol for correlation and/or time stamping each single acquired data or event. In one embodiment, the time protocol comprises the precision time protocol (PTP) defined in the IEEE 1588 standard. Other methods for time coordination are contemplated, including other protocols such as the network time protocol (NTP or Simple NTP), global positioning system (GPS), and a variety of other known or future developed time protocols. As a local Ethernet backplane, the backplane assembly 22 is able to support the IEEE 1588 high precision time protocol. As the data is received at one or more functional modules, it may be time-stamped by the time protocol so it can be correlated in time with the time-stamped data from other functional modules. Time stamp accuracy may be in the range of 100 ns, or more or less. In one embodiment, any of the data/events generated in any of the multiple functional modules in the system 10 can be processed chronologically.

Figure 4:
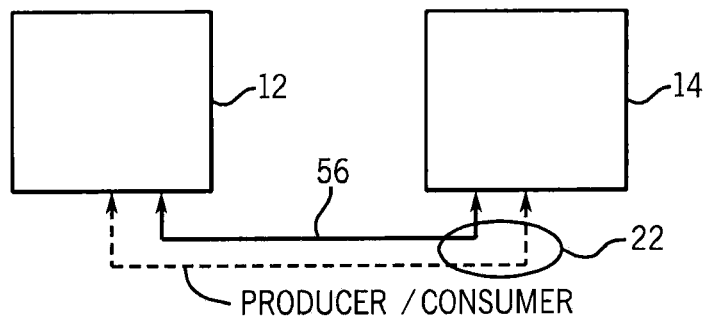
FIG. 4 is a block diagram of a producer/consumer communication model usable with the present embodiments.

Scheduled data updates and real time data updates may be transmitted using the producer/consumer model (see FIG. 4). For example, a functional module 14 may publish its module description on the backplane 22 during the initialization process by responding to a create assembly local command. Once the functional module 14 is recognized, the primary module 12 may then open an input and output (I/O) connection 56 between the primary module and the functional module through the use of a create connection local command. After the system initialization, during the system runtime, the functional module 14 may keep publishing its data on to the backplane periodically by responding to data update local commands. If one of the other functional modules 16, 18, 20 in the system or a new functional module requires data from the functional module 14, the other or new functional module(s) may create an input-only connection with the functional module 14 to subscribe the data produced by the functional module 14.

As described above, the multifunctional system 10 may be data driven and may include multiple functional modules connected through the backplane assembly 22. The producer/consumer model allows modules to send (produce) and receive (subscribe) data independent of the I/O connections 56, where the data is collected directly from the module/backplane without the need for complicated programming. Each of the modules can be a data publisher or a data subscriber. During the system run time, the data publishers publish data to the backplane, and the data subscribers get the data that they are interested in from the backplane. This approach defines the data exchange between modules in the producer, consumer scheme. System behavior is advantageously more predictable, making data exchange easier to verify. In the producer/consumer model, the modules are decoupled and each module is adapted to work independently. Boundary conditions are the factors that reflect each modules status. These boundary conditions are advantageously easier to identify and validate, and they provide information about each module that may simplify system maintenance.

In other cases, certain modules may be programmed to "listen" on the backplane for data transmissions tagged as originating from other modules, and these certain modules may then consume information in the data transmissions when the originating module is one from which information is sought.

Figure 5:
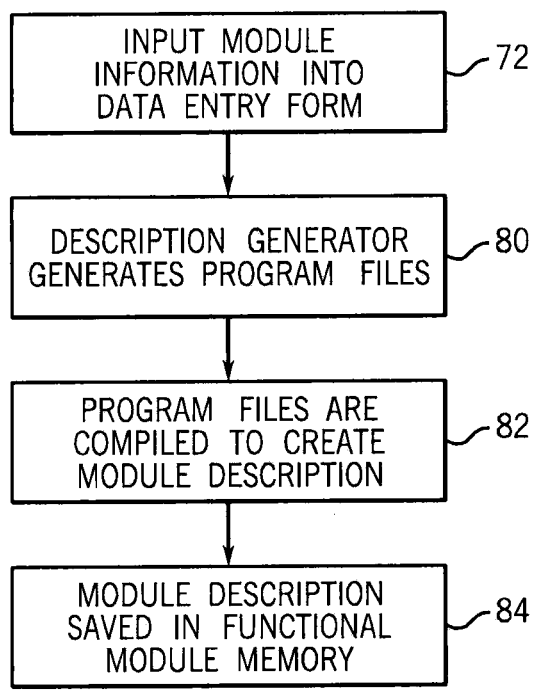
FIG. 5 is a flow chart showing the steps of creating a module description according to an embodiment of the invention.
Figure 6:
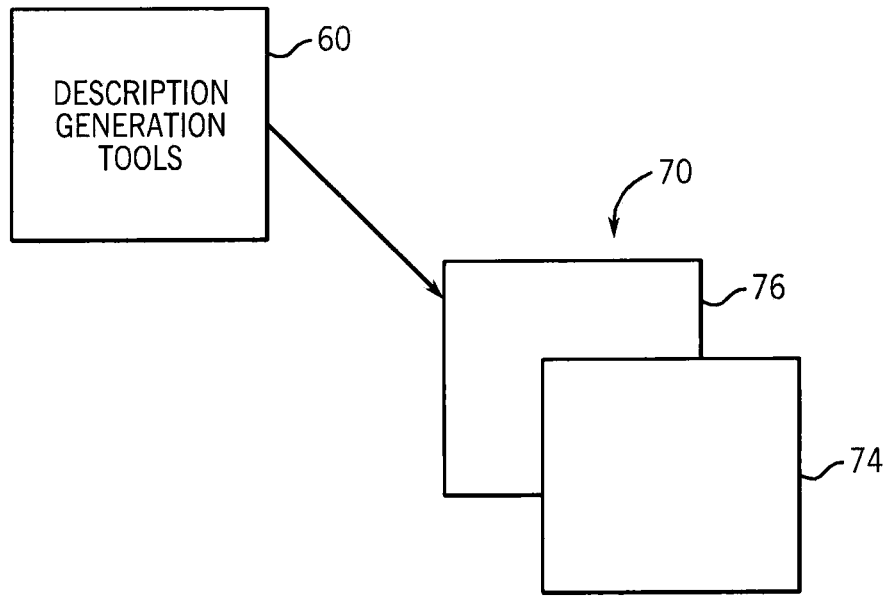
FIG. 6 is a block diagram showing an embodiment of a description generator tool kit.

The steps performed while practicing an exemplary embodiment of creating the module description 40 consistent with the embodiments described herein are set forth in FIG. 5. The description generator tool 60 helps a functional module firmware developer to create module descriptions. The description generator tool 60 may be developed by using Microsoft Excel Visual Basic for Applications (VBA), although it is contemplated that other software may be used as well. Referring particularly to FIG. 5, the first step inputs module specific information into the description generator tool 60 running on a PC, such as a laptop for example, (not shown) that includes a preconfigured data entry form 70 (see FIG. 6), such as a spreadsheet form, for example an Excel spreadsheet, as indicated at process block 72. In one embodiment, the spreadsheet form 70 contains two parts or sections (although not required); a section 74 for data table information and a section 76 for the description generator code in VBA. It is to be appreciated that each section may include one or more "sheets" or "pages." The data table section 74 in the spreadsheet form 70 is used by the developer to input detailed information about the functional module parameters and about the parameters internal data table structures 44 and external data table structures 46. The functional module firmware developer may only need to fill the information into the data entry form 70 in the preconfigured format.

At process block 80, the description generator tool 60 is used to generate program files, including but not limited to .c files (C or C++ programming language files) and/or .h files (header files). At process block 82, the program file(s) are compiled to create the module description 40. The program files can be compiled by different compilers, which depends on the type of processor 88 in the functional modules. For example, if a functional module uses a DSP processor, the functional module developer may use the compiler for the DSP processor to generate the compiled module description. And if a functional module uses an ARM processor, the developer may use a specific compiler for the ARM processor. Next, at process block 84, the module description 40 is saved in memory 86, such as non-volatile memory in the functional module.

Figure 7:
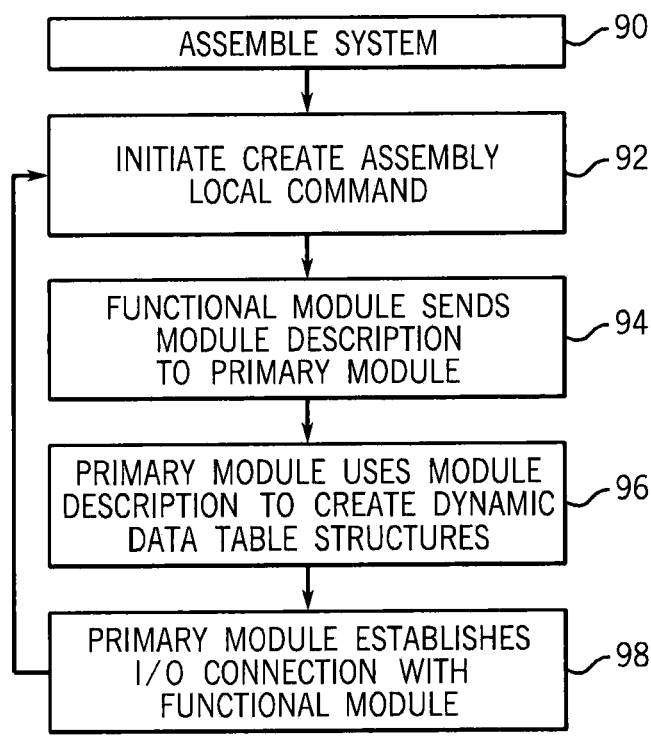
FIG. 7 is a flow chart showing the steps of self-organizing a power and energy control and management system according to an embodiment of the invention.

Once the module description 40 is generated for each module and the system 10 is assembled, the system can be self-organized. The steps performed while practicing an exemplary embodiment of self-organizing the system 10 consistent with the embodiments described herein are set forth in FIG. 7. The first step includes assembling a system including a primary module 12, at least one functional module 14, a backplane assembly 22, and a power supply module 18, as indicated at process block 90. Once assembled, at process block 92, power is supplied to the system 10. At system initialization time, the primary module 12 initiates a create assembly local command across the backplane 22. Next, at process block 94, the functional module 14 sends its module description 40 to the primary module 12. At process block 96, the description parser 50 of the primary module 12 uses the functional module description 40 to create the dynamic data table structures 42. An I/O connection 56 may then be established at process block 98, allowing communication between the primary module 12 and the functional module 14. The steps are repeated starting at step 92 for any additional functional modules in the system 10. Steps 92, 94, and 96 may also be repeated when a new functional module is added to a previously organized system 10.

As seen in FIG. 1, the previously described communication interface 28 of the primary module 12 provides access to other systems and devices on the network 100. Additional devices such as a laptop 102, a display 104, and/or a Human Machine Interface (HMI) 106, as non-limiting examples, may also reside on the network 100 and may communicate directly or indirectly with the primary module 12 or other devices on the network. The additional devices allow a user to access the external data tables 47 from the primary module 12 for system data analysis.

Therefore, systems and methods that are adapted to self-organize a multifunctional power and energy control and management system by integrating multiple backplane based modules through module descriptions without the need for a user to configure the system by using configuration software are provided. A dynamic data structure may be incorporated to improve data access, storage and updating. It is contemplated that the data/data structures may be time-stamped and temporarily or permanently recorded. The time-synchronized data may then be made available to each module in the system for analysis.

The foregoing has been a detailed description of illustrative embodiments of the invention. Various modifications and additions can be made without departing from the spirit and scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate embodiments. While the preferred embodiment has been described, the details may be changed without departing from the invention, which is defined by the claims.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this invention.

We claim:

1. A system comprising:
a backplane assembly;
at least one functional module coupled directly to the backplane assembly to receive process related data, the at least one functional module including a unique functional module description, the functional module description including control logic for controlling the at least one functional module and parameters associated with the functional module; and
a primary module coupled directly to the backplane assembly, the primary module including a description parser to receive the at least one functional module description through the backplane assembly, and interpret the at least one functional module description and to dynamically create a data table structure associated with the at least one functional module, the dynamically created data table structure including at least one parameter and the control logic associated with the functional module, and the dynamically created data table structure configured to manage a plurality of data received from and transmitted to the at least one functional module based on the at least one parameter and the control logic.

2. The system according to claim 1:
wherein the data table structure includes a consecutive memory value pool adapted for data accessing and uploading.

3. The system according to claim 1:
further including a power supply module, the power supply module coupled to the backplane assembly and adapted to provide power across the backplane to each module coupled to the backplane assembly.

4. The system according to claim 1:
the primary module further including a logic engine adapted to operate on data in the data table structure.

5. The system according to claim 1:
wherein the system comprises a power and energy control and management system.

6. The system according to claim 1:
wherein the process related data includes energy related data.

7. The system according to claim 1:
wherein the data table structure includes at least one external data table corresponding to the at least one functional module.

8. The system according to claim 1:
wherein the functional module description includes information about data structures, including information about internal data table parameters and external data table parameters.

9. The system according to claim 1:
wherein the at least one functional module is configured to manage its communications to and from the backplane assembly.

10. The system according to claim 1:
wherein the data table structure includes at least one internal data table corresponding to the at least one functional module.

11. The system according to claim 10:
wherein the at least one functional module further includes at least one internal data table that corresponds to the at least one internal data table in the data table structure.

12. The system according to claim 7:
wherein the primary module uses the at least one external data table to exchange data with at least one device that is not coupled to the backplane assembly.

13. The system according to claim 1:
wherein the description parser is further adapted to create a parameter list based on the unique module description of the functional module.

14. The system according to claim 13:
the primary module further including control logic, and wherein parameters in the parameter list are adapted to be used as inputs to the control logic.

15. The system according to claim 1:
further including additional functional modules, the functional module adapted to exchange data with the additional functional modules without intervention from the primary module.

16. The system according to claim 15:
wherein when a real-time data is received at the functional module, the real-time data is time-stamped by a time protocol so the time-stamped real-time data can be correlated in time with time-stamped real-time data from the additional functional modules.

17. The system according to claim 1:
wherein the description parser is configured to receive and interpret the at least one functional module description upon self-organization of the system, wherein the system is configured to:
i) send the module description across a backplane assembly to a primary module;
ii) use the description parser to dynamically create the data table structures based on the module description; and
iii) establish an I/O connection between the primary module and the functional module.

* * * * *